(12) United States Patent
Malandain et al.

(10) Patent No.: US 6,392,653 B1
(45) Date of Patent: May 21, 2002

(54) DEVICE FOR PROCESSING ACQUISITION DATA, IN PARTICULAR IMAGE DATA

(75) Inventors: Grégoire Malandain, Antibes; Luc Robert, Valbonne, both of (FR)

(73) Assignee: Inria Institut National de Recherche en Informatique et en Automatique (FR)

(*) Notice: Subject to any disclaimer, the term of this patent is extended or adjusted under 35 U.S.C. 154(b) by 0 days.

(21) Appl. No.: 09/338,795

(22) Filed: Jun. 23, 1999

(30) Foreign Application Priority Data

Jun. 25, 1998 (FR) .............................................. 98 08087

(51) Int. Cl.⁷ ............................................ G06F 15/00
(52) U.S. Cl. ..................................... 345/501; 382/254
(58) Field of Search ................................ 345/501, 530, 345/561, 522, 544; 382/254, 256, 258, 307; 358/296

(56) References Cited

U.S. PATENT DOCUMENTS

| 4,606,066 A | 8/1986 | Hata et al. ................... 382/260 |
| 4,807,297 A | 2/1989 | Hosoda ........................ 382/304 |
| 5,204,752 A | * 4/1993 | Yamakawa ................... 358/296 |

* cited by examiner

Primary Examiner—Kee M. Tung
(74) Attorney, Agent, or Firm—Rabin & Berdo, P.C.

(57) ABSTRACT

The invention relates to the field of binary image processing operations, such as thinning or thickening of 2D or 3D images with pixels or with voxels, respectively. The device according to the invention has processing means which rely on the logic of binary decision diagrams, of reduced order and with inverting branch instructions, in particular for determining whether or not a current element is a simple point. The binary decision diagram then defines a set of comparisons of bits of the elements of a chosen neighbourhood of the current element, which ends up at a terminal node "1" or a terminal node "0", defining a particular property of the current element.

15 Claims, 6 Drawing Sheets

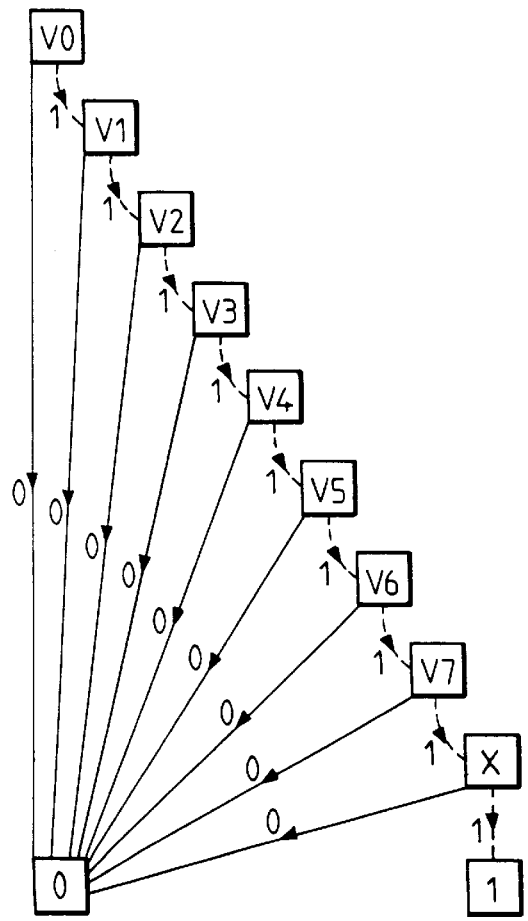
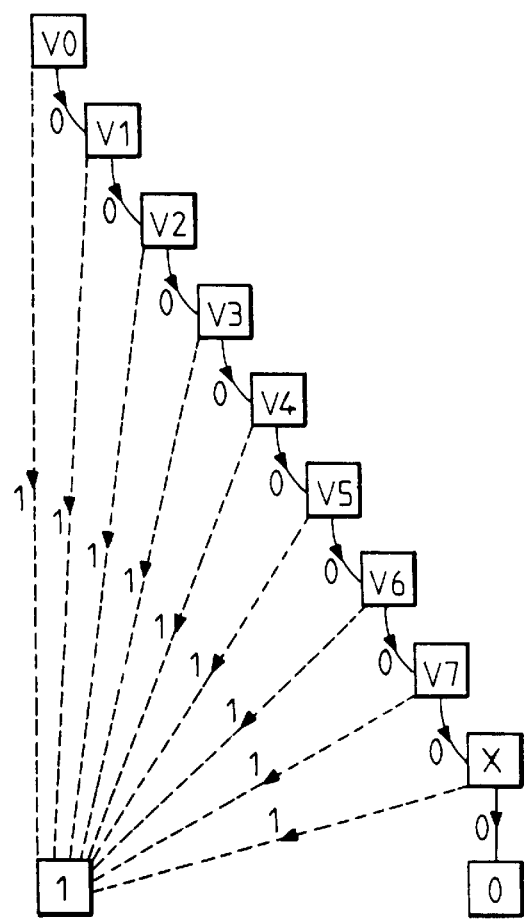
FIG. 3    FIG. 4a    FIG. 4b
FIG. 5a    FIG. 5b

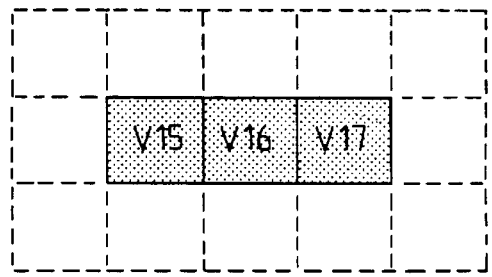
FIG.6a          FIG.6b
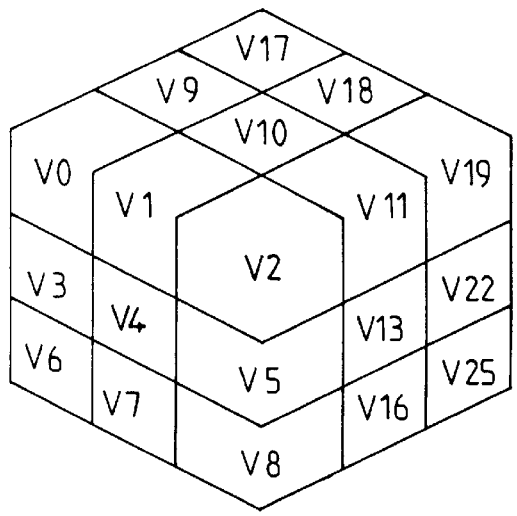  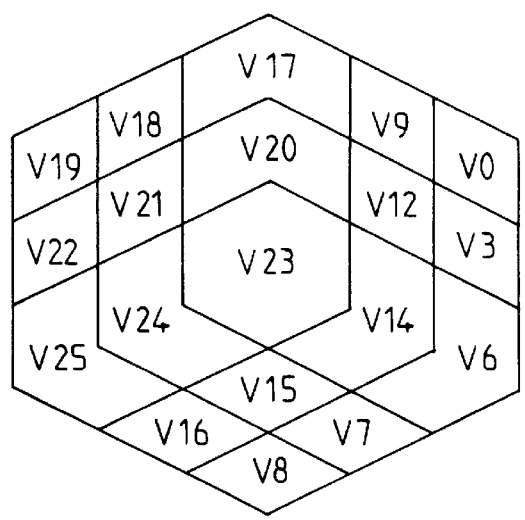
FIG.11a         FIG.11b

DEVICE FOR PROCESSING ACQUISITION DATA, IN PARTICULAR IMAGE DATA

FIELD OF THE INVENTION

The invention relates to the field of processing operations carried out on acquisition data. These data relate to physical representations such as two-dimensional or three-dimensional images, for which it is possible to define a neighbourhood relationship between the elements which constitute them.

Such acquisition data are provided in the form of a sequence of elements, comprising at least one bit per element. In the case of a two-dimensional image, each element of the image (or pixel) has its own attributes, for example colours and/or grey scale levels coded on a certain number of bits. It will thus be understood that the pixels on a line of a black and white two-tone two-dimensional image may have a "black" attribute, while the pixels of the background have a "white" attribute. These attributes are then coded on a "0" or "1" bit, for example "0" for "white" and "1" for "black". As for the position of the pixel, this can be coded according to the column and the row to which it belongs. These two data items are generally recorded in memory in order to extract information about the image therefrom (characteristic point sets), or alternatively to create subsequent modifications to the image, such as erosion, dilation and/or thinning of lines (and/or surfaces in the case of a three-dimensional image).

These various processing operations generally consist in attributing to a current element a "result word" which is a function of a comparison of the respective bits of neighbouring elements in the sequence of this current element. In practice, this comparison is made on the basis of successive tests on the bits of the elements which define a chosen neighbourhood of the current element.

PRIOR ART

The conventional devices which perform such processing operations proceed according to two different general techniques. A first technique consists in systematically reproducing the chosen processing operation. It is then commonplace for the bit value of one of the neighbours of the current element to be tested a plurality of times during processing. A second technique proposes to remedy this problem by providing, after each test of an element of the neighbourhood, two tests of another element of the neighbourhood. These two tests respectively correspond to the bit values "0" and "1" of the element tested beforehand. The number of tests to be carried out thus substantially amounts to the number of elements to be taken into consideration in the neighbourhood. However, the number of tests to be provided increases as $2^n$ as a function of the number of elements n.

Tests of the aforementioned type are often carried out using computer programs. The programs which apply the first technique have a small number of instructions, but require particularly long execution times. Conversely, the programs which apply the second technique have satisfactory execution times, but comprise on average one instruction per test provided, and may reach prohibitive lengths, which tends to increase the processing workload.

OBJECT OF THE INVENTION

It is an object of the present invention to improve the situation.

SUMMARY OF THE INVENTION

The invention is therefore based on a device for processing acquisition data, comprising:

a) a first memory area for storing a sequence of acquisition data, in the form of sequence elements, each having at least one bit;

b) a second memory area comprising a module for access to the first memory area, which can be addressed in order to access the neighbourhood of a designated current element;

c) a third memory area for storing a calculation module, capable of receiving as input a designation of at least one current element, in order to deliver as output to the said neighbourhood of this current element a result word representative of the application of a chosen processing function, this module comprising a set of instructions, with test instructions, each relating to one bit, and forming, from an input instruction, paths where the test instructions are relayed to reach final instructions defining the result word, bit by bit; and d) control means for repetitively implementing this module in cooperation with a working memory, on the basis of successive current elements, in order to obtain a multiplicity of result words, representing an at least partial transform of the sequence by the said processing function.

According to the invention, the calculation module is provided with an instruction set optimized by a technique of reducing the binary decision tree associated with the said function, in order jointly to minimize the total number of test instructions accumulated over all the paths defined by the test instruction set, and the total number of instructions in this set. Thus, the processing speed is increased by a better compromise between the total memory occupancy of the instruction set and its execution rate.

In a preferred embodiment of the present invention, each test instruction has a conditional branch instruction to go to another test instruction or a final instruction, as a function of the bit which is tested, and the module has at most two final instructions in the memory area. Advantageously, the test instruction set accesses a bit of an element in the neighbourhood at most only once during execution, while the test instructions are relayed, during execution, to one of the two final instructions, designed to designate a result variable representative of one bit of the result word.

According to one of the advantageous characteristics of the invention, the test instruction set has test instructions with inverting branch instructions, while each bit of the result word is defined in correspondence with the associated result variable and a parity of the number of inverting branch instructions taken during execution.

BRIEF DESCRIPTION OF THE DRAWINGS

Other objects and advantages of the invention will become apparent on studying the following detailed description, given by way of example, of the accompanying annexes and of the drawings, in which:

FIG. 3 represents, in the example described, the neighbourhood associated with a current element in a two-dimensional image, FIGS. 4a and 4b represent the respective effects of erosion and dilation of a two-dimensional image, FIGS. 5a and 5b represent the reduced and ordered binary decision diagrams respectively associated with erosion and dilation of a two-dimensional image, FIG. 6a represents a neighbourhood associated with three contiguous current elements, in the example, of a two-dimensional image for the processing of a plurality of current elements at once by two-dimensional image erosion and/or dilation, these three current elements being numbered V4, V7 and V10, FIG. 6b represents the numbering of the three elements for which the chosen processing attributes a to each result bit, the result bits together forming a result word.

DETAILED DESCRIPTION OF THE PREFERRED EMBODIMENT

Annex I is a transcription of a processing operation which makes it possible to detect simple points of a two-dimensional image and is constructed, according to the invention, on the basis of a reduced and ordered binary decision diagram, including inverting branch instructions. The processing operation, compiled in the computer language C, comprises one test and two branch instructions in each line. The start of this Annex I describes a function in the C language, annotated with comments and involving elements used for the detection of simple points (connectivity criterion), independently of any consideration of a tree structure for the tests.

Annex II is a transcription of the computer processing in Annex I, compiled in the C language and including nested tests.

Annex III is a transcription of a processing operation which makes it possible to detect simple points of a three-dimensional image and is constructed on the basis of a reduced and ordered binary decision diagram, containing inverting branch instructions.

Lastly, Annex IV is a transcription of a computer processing operation compiled in the C language, which makes it possible to detect simple points which are not end points and is constructed on the basis of a reduced and ordered binary decision diagram, containing inverting branch instructions.

The drawings and the annexes essentially contain elements whose character is understood. They can therefore be used not only to explain the description better, but also to contribute to the definition of the invention, where appropriate.

The documents which belong to the prior art and are cited below are analysed with the same terminology as that used to describe the present invention. This leads to an interpretation which may extend beyond the objective content of the said documents in the eyes of the person skilled in the art if not yet acquainted with the invention.

Figure 1:
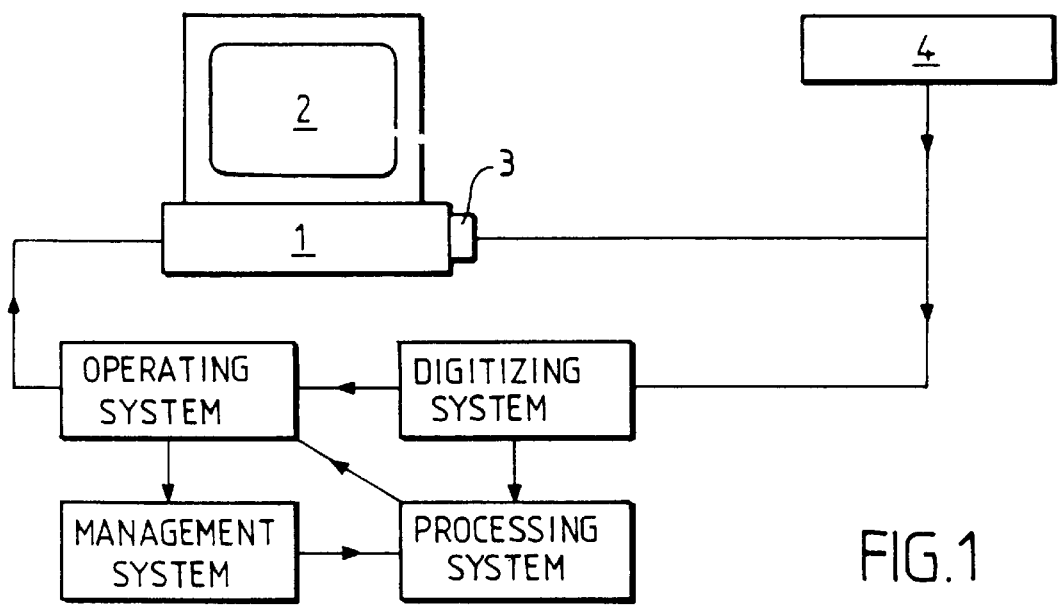
FIG. 1 schematically represents a sequence processing device by showing in particular the interaction between various systems which it comprises in the example described.

Reference will first be made to FIG. 1, which represents a device for processing a sequence which, in the example described, is a two-dimensional or three-dimensional image. Such a device may have a computer 1 provided with a memory and a central processing unit with a microprocessor, which are run by an operating system, for example an environment such as Windows, DOS or UNIX (registered trademarks). The computer is equipped with a monitor screen 2 and a user peripheral 3 for receiving the sequence to be processed, for example a two-dimensional image from a simple digital scanner, a CCD camera, or alternatively a three-dimensional image delivered by a set of probes or a medical scanner.

In the case, for example, of a medical scanner, the radiodiagnosis equipment is composed of a tomography system and of a computer which analyses its data to reconstruct images of various parts of a body, in thin sections. The image to be processed may be a medical image representing human biological tissue. In this case, it is often necessary to preprocess the image for thinning lines and/or surfaces, or alternatively by erosion or by dilation, in order to highlight, for example, blood vessels in the tissue on a different coloured background.

In conventional image processing devices, it is common to encounter a digitizing system incorporated in the computer in the form of digitizing software, or alternatively incorporated with a scanner at the input of the user peripheral 3. The digitizing system generally cooperates with the operating system to sample the sequence as a multiplicity of elements. For example, in the case of a two-dimensional image, the digitizing system may sample the image as a plurality of elements commonly referred to as "pixels". It may furthermore subdivide a three-dimensional image into a multiplicity of parallelepipedal elements, called "blocks" or alternatively "voxels". Then the operating system cooperates with the digitizing system to record the respective attributes and positions of the elements in the sequence in an ordered way in the memory of the computer 1.

In the example described, the processing device comprises an image management system which may be in the form of software which provides a user with the possibility of choosing a processing operation from among erosion, dilation and thinning of lines and/or surfaces. The processing device attributes to a current pixel (or voxel) X a result bit which is a function of the type of processing chosen, by comparing the bits of the pixels (or voxels) neighbouring this current pixel (or voxel) X.

In the case for example of thinning lines of a two-dimensional image, the device is designed to make a search for simple points and furthermore comprises means for detecting end points in order to thin the lines of the image. In practice, this involves modifying the bit values of simple points which are not end points so that, in the processed image, they appear in the background. The management system then presents a user, via the monitor screen 2, with an image whose lines are thinned according to criteria which will be described below.

The device has a module for firstly accessing a first memory area and for extracting a current element X to be processed, as well as a set of elements neighbouring this current element. Beforehand, a neighbourhood relationship between the elements is defined as a function of the type of processing desired. For example, in the case of a two-dimensional image, the neighbourhood of a current pixel may consist of its 8 immediate neighbours, and optionally the current pixel itself (FIG. 3). In the case of a three-dimensional image, this neighbourhood may extend to 26 nearest neighbours (FIGS. 11a and 11b). The access module of the device comprises a set of call instructions which are stored in a second memory area.

The device furthermore has a calculation module stored in a third memory area. This module comprises a set of test instructions which can compare the respective bits of the elements of the neighbourhood, by carrying out successive tests on these elements, so as where appropriate to assign a new bit value to the current element X as a function of this comparison. The new bit values of the processed elements are lastly sent to the operating system in order to be recorded in memory. The comparison procedure relies according to the invention on the structure of a binary decision diagram.

Among the techniques on which conventional processing (or preprocessing) means are based, many methods rely on the evaluation of bits of pixels or blocks neighbouring a pixel or a block of the image. Each of these methods uses a function which, for a given element of the image, analyses the binary values (or bits) of its neighbours. This function is generally evaluated a plurality of times during the analysis procedure.

One conventional approach consists in constructing a crude look-up table for all the neighbourhood elements. This approach is disclosed in particular by the reference:

[1]—"An algorithm for a 3D simplicity test" (L. LATECKI and C. C. MA, *Computer Vision and Image Understanding*, 63(2):388–393, March 1996)

All the input variables are then examined once so as to assign them an address in the table. Thus, if N elements of the neighbourhood are to be considered, the number of entries in the table must be $2^N$. In the case of a three-dimensional image, the limits in terms of computing power and storage capacity of the computer used are rapidly reached. A reduction in the number of tests may sometimes be envisaged by taking into account certain symmetries of the problem. However, the tests provided always follow a symmetrical tree structure of the "quad-tree" type.

The approach according to the invention relies on the use of binary decision diagrams (BDD) as adequate representations of Boolean functions processing Boolean variables.

Firstly, a compact BDD is constructed which represents the Boolean function to be evaluated. This may be a formal, that is to say simple Boolean, function. In this case, the associated BDD represents the function explicitly. Otherwise, the function is generally broken down by the so-called "brute force" method disclosed in particular by:

[2]—"An approach to unified Methodology of combinational switching circuits" (E. Cerny, and M. A. Marin, *IEEE Trans. Comput*. C-26, p. 745–756, 1977).

The BDD is then compiled in a powerful code, for example the C language.

The advantage of using a reduced expression of a BDD for generating such a code pertains in particular to the fact that only those pixels whose value does in fact affect the result are examined. Furthermore, for each pixel examined, the code performs only one test, one branch instruction and, under certain conditions, one binary operation on the register. This property of codes using BDDs will become more apparent in the image processing examples described below.

Figure 2A:
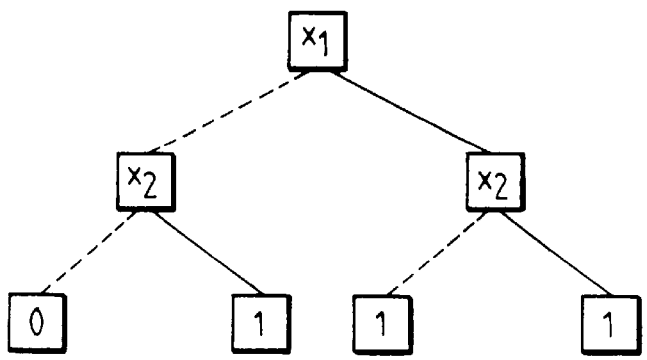
FIG. 2a represents, by way of example, the crude tree structure of a simple function which, with two logic variables $x_1$ and $x_2$, associates their sum $x_1 + x_2$ corresponding to the Boolean "or" function.

The principle of binary decision diagrams is known per se, in particular from combinatorial logic. A binary decision diagram represents a Boolean function using an acyclic tree structure. Each node of the tree structure corresponds to one test of a Boolean variable. This tree structure has two terminal nodes corresponding to the binary values of the function: the logic levels (or bits) "0" and "1". By way of example, FIG. 2a represents a tree structure which, with a simple Boolean function that has two variables $x_1$ and $x_2$, associates their sum $x_1 + x_2$ which corresponds to the logic "or".

Figure 2B:
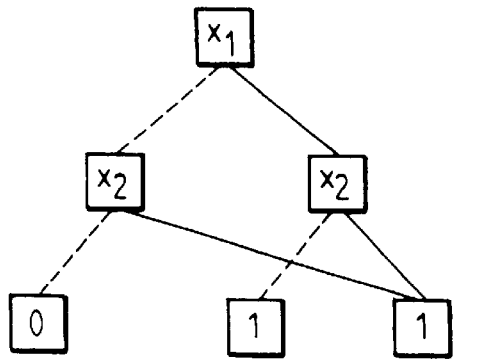
FIG. 2b represents an arbitrary binary decision diagram associated with the sum function.
Figure 2C:
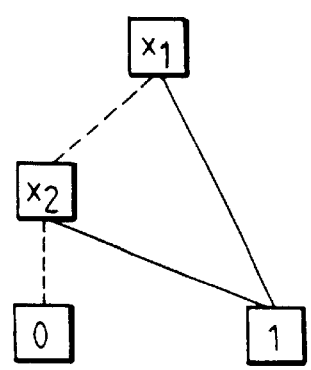
FIG. 2c represents the reduced and ordered binary decision diagram associated with this function.

By imposing a predetermined order for analysing the variables and by sharing some of the nodes in the tree structure, it is possible to reduce the size of this tree structure substantially. In the example represented in FIG. 2a, each node represents a test of the "if" type on a variable. The solid lines represent the "then" branches and the dashed lines represent the "else" branches. This representation of the "sum" function corresponds to a complete tree structure according to the BOOLE-SHANNON expansion. The representation in FIG. 2b for the same function then demonstrates that the terminal node 1 on the left of the tree structure can be advantageously removed. By making this tree structure slightly more compact using a simplified BDD, it is then possible to remove an instruction from the programmed processing of such a function. FIG. 2c then shows one of the two possible BDDs, which is associated with the "sum" function with, as represented, "$x_1$ before $x_2$". The BDD is then presented in its most compact form and contains only two terminal nodes. Such a representation then corresponds to a so-called reduced and ordered BDD (ROBDD) having only two terminal nodes.

This representation is canonical, that is to say if the order for analysing the variables is fixed and if the reduction rules are applied, two equivalent Boolean functions have the same representation per binary decision diagram. Thus, FIG. 2c represents an ROBDD of the "sum" function in FIG. 2a.

In order to make the ROBDD obtained even more compact, the so-called "complementary edges" method may be used. This method is disclosed in particular by the reference:

[3]—"Perfect normal forms for discrete functions" (J. P. BILLON, *Research Report* 87019, BULL, March 1987)

This makes it possible to avoid testing the same node more than once, a distinctive binary character, for example + or −, being assigned to each branch of the diagram. In the example described, those branches of the diagram which have the −sign then act as branch instructions which invert the final result.

For the rest of the description below, the abbreviation BDD corresponds to a "reduced and ordered binary decision diagram with complementary edges".

Applicant has now shown that the use of BDDs can be applied to the processing of two-dimensional and three-dimensional images.

In the case of a two-dimensional image, a neighbourhood may be associated with a selected element, consisting of eight nearest-neighbour elements of the selected element and occupying eight respective cardinal positions: North-West, North-East, East, South-East, South, South-West, West and North. These elements are respectively denoted V0, V1, V2, V3, V4, V5, V6 and V7. The choice of the neighbourhood and, in particular, the number of elements per neighbourhood actually depends on the choice of the processing function f. A neighbourhood with eight elements for the processing of a two-dimensional image is represented in FIG. 3.

In certain cases, image processing functions may be represented directly by simple Boolean operations on the values of the pixels of the neighbourhood. For example, in the case of erosion, if a pixel whose bit value is "1" is considered, a new value "0" is assigned to it if, and only if, it and/or at least one of its neighbours has a bit value equal to "0". The function for modifying the value of the pixel in question is thus equivalent to:

$$f(X)=X.x_1.x_2.x_3\ldots x_n,$$

where "." corresponds to the "and" Boolean function, and the $x_i$ are the Boolean variables representing the bit values of the pixels of the neighbourhood of the pixel in question.

In the case of dilation, the function f is expressed by:

$$f(X)=X+x_1+x_2+\ldots x_n,$$

"+" corresponding to the "or" Boolean function.

FIG. 4a represents the effect of erosion on a current central element X as a function of its eight nearest neighbours. A "0" bit value is then assigned to the selected element if it and/or at least one of the neighbourhood elements has a "0" bit.

FIG. 4b represents the effect of dilation on a current central element X as a function of its eight nearest neighbours. In this case, a logic "0" is assigned to the current element if it and all the elements of the neighbourhood have their bit equal to "0", otherwise a "1" is assigned to it.

FIGS. 5a and 5b show the BDDs representing the Boolean functions associated respectively with erosion and dilation. For erosion as for dilation, the BDD of the Boolean function constitutes an explicit representation of the function.

The preprocessing means may be in the form of a programmed computer process which, according to the invention, follows a tree structure equivalent to a BDD with reduced expression. It then has one test instruction for each test node of the BDD. Two conditional branch instructions are associated with each test carried out. A first conditional branch instruction corresponds to the bit value "0" of the pixel tested, and a second conditional branch instruction corresponds to the bit value "1" of the pixel tested. These conditional branch instructions are equivalent to the "then" and "else" branches of the BDD, and lead to other nodes of the diagram. If this processing is programmed in the C language, for example, a test line L may comprise the following instructions:

L: if (x) goto L1; else goto L2;

The processing providing a tree structure equivalent to a BDD of reduced order then has two stop points equivalent to the two terminal nodes of the BDD. Interrupt branch instructions, which correspond to branches of the BDD connecting a test node to a terminal node, are then associated with these stop points. The processing thus provides a set of tests ordered by an "if" instruction, conditional branch instructions ordered by the "goto" instructions and stop points ordered by final instructions of the "return R" and "return !R" type. R and !R correspond to two conjugate logic states of the stop point: !R corresponds to "not R".

In order to carry out image erosion and/or dilation, the processing then comprises one test instruction per element of the neighbourhood, a conditional branch instruction to another test instruction of another element of the neighbourhood, and an interrupt branch instruction to a stop point, and it does so for each element of the neighbourhood.

The processing may be applied more generally to a plurality of current elements to be processed, for example to three current elements. The calculation module is then designed to evaluate a result word V15-V16-V17 (instead of a single result bit), on the basis of three current elements (or pixels) V4, V7, V10 (FIG. 6a) which are nearest-neighbours and contiguous in the example. Each comparison then deals with a set of elements which consists of the union of the three groups of nearest-neighbours of each of these pixels, and thus comprises 15 elements V0, . . . , V14. The three result bits corresponding to the respective result bits of the current pixels are numbered V15, V16 and V17. V15, V16 and V17 respectively occupy the same positions as V4, V7 and V10 (FIG. 6b).

Figure 8:
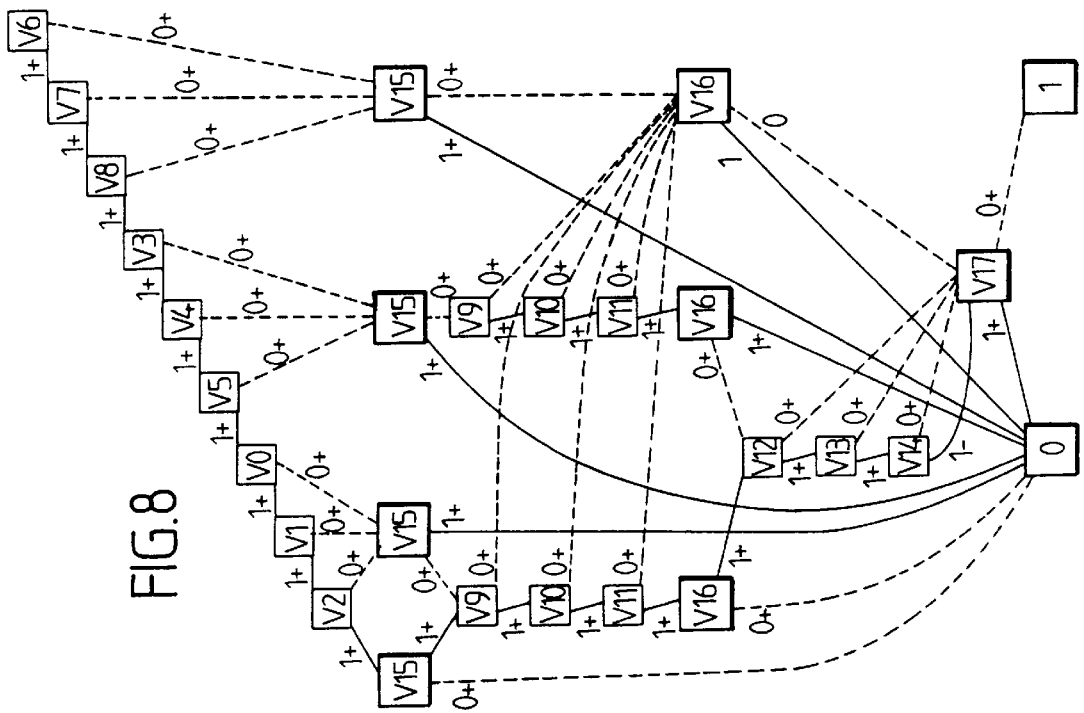
FIG. 8 represents the reduced and ordered binary decision diagram, with inverting branch instructions, which is associated with two-dimensional image erosion, on a neighbourhood of three contiguous current elements which are included in this neighbourhood.
Figure 7:
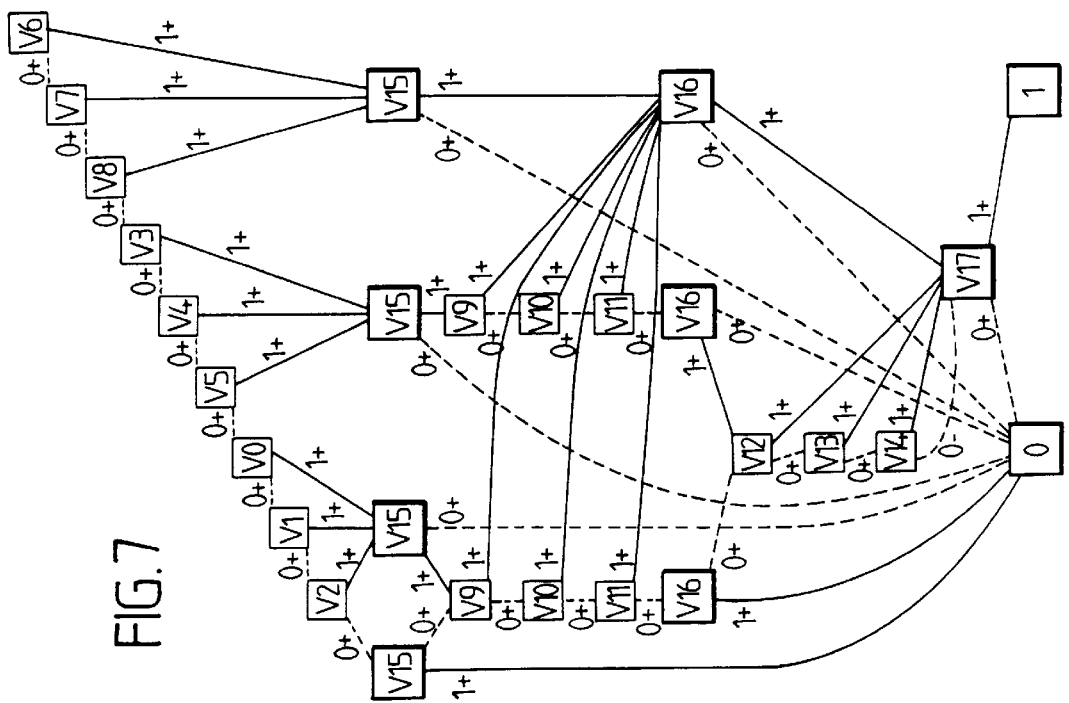
FIG. 7 represents the reduced and ordered binary decision diagram, with inverting branch instructions, which is associated with two-dimensional image dilation, on a neighbourhood of three contiguous current elements which are included in this neighbourhood.

FIGS. 7 and 8 represent the BDDs (with inverting branch instructions) associated respectively with dilation and erosion of a two-dimensional image, with three current pixels to be processed in a single series of comparisons. The nodes "0" and "1" correspond respectively to a "false" and "true" hypothesis formulated on each bit of the result word, and to inverting if the number of inverting branch instructions taken during the comparison is odd. At least some of the nodes of the diagram thus need to be run through until reaching the terminal node "1" (if the inverting branch instructions taken when running through the tree structure add up to an even number, or to the terminal node "0" otherwise). On each arrival at the node "0" (taking the aforementioned parity into account), the tree structure needs to be run through in the opposite direction in order to return to the last bit assessed and to assign it a conjugate result value. The set of result bit values found then constitutes a result word for the three current pixels.

In the case when no simple Boolean function can describe the function to be processed, f may be broken down. This breakdown can be carried out using the "brute force" method [2]. Such a breakdown involves only simple Boolean functions of the "and" and "or" type. It can be found in the example described below.

The applicant has proposed an application of the invention to the detection of simple points of two-dimensional (2D) and three-dimensional (3D) images. A simple point is a point of a binary image which can change attribute (1 or 0) without the topology of the image being substantially modified. In the scope, for example, of processing by thinning, the detection of simple points makes it possible, in particular, to thin the shapes without cutting them. Thus, with the conventions used above, if processing by thinning (thickening) is carried out with prior detection of simple points, the "1" ("0") attribute of a point is converted to "0" (to "1") if this point is a simple point.

In the field of 3D images, and more particularly medical images, the detection of simple points is nowadays arousing increasing interest. It is therefore desirable to obtain the simplest possible processing operations.

The detection of simple points in a 2D image by a processing operation using a BDD will be presented first. The applicant has also proposed a processing operation using a BDD and allowing the detection of simple points in a 3D image. This will be described subsequently.

The compilation of a set of tests for the detection of simple points must firstly deal with the choice of a connectivity criterion. In practice, this involves choosing one connectivity for the "1" elements and another for the "0" elements, the pair of connectivities which are chosen needing to satisfy certain conditions, which are described, in particular, by:

[4]—"Digital topology: introduction and survey" (T. Y. Kong and A. Rosenfeld, *Computer vision, graphics and image processing*, 48, 357–393, 1989)

The connectivity criterion chosen in the example, to search for simple points in a 2D image, consists in taking four connected components from among those which occupy the North, East, South and West cardinal positions of a neighbourhood with eight nearest-neighbour elements of the current central element X.

Figure 9A:
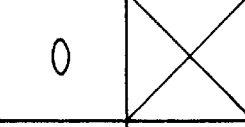
FIGS. 9a, 9b and 9c represent examples of neighbourhoods in which the central current element represented by a cross is considered as being a simple point of a two-dimensional image, according to a connectivity criterion chosen in the example described, this current element not forming part of the neighbourhood in question.
Figure 9B:
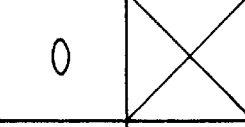
Figure 9C:
Figure 9D:
FIGS. 9d, 9e and 9f represent examples of neighbourhoods in which the central element is not a simple point according to the same connectivity criterion.
Figure 9E:
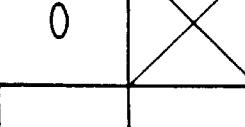
Figure 9F:
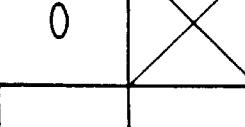

FIGS. 9a, 9b and 9c represent situations in which the central element is considered as being a simple point as a function of the bit values of the elements of the neighbourhood, while FIGS. 9d, 9e and 9f represent situations in which the central element is not considered as being a simple point, according to the aforementioned connectivity criterion. The dashed hatching signifies that the bit value of the element of the neighbourhood may be "0" or "1", without this influencing the result in any way.

It should be noted that, in the case of detecting simple points, the current element does not form part of the neighbourhood as described above. The bit comparison does not therefore involve the current element. Furthermore, it will be seen below that the "0" and "1" terminal nodes of the BDD make it possible to determine directly whether or not the current pixel is simple, without any hypothesis being formulated in advance on this pixel.

Referring to FIGS. 9a, 9b and 9c, the central element is a simple point:

if one or more of the elements of the neighbourhood, which are pairwise neighbours by a side or a vertex, carry the value "1" in the example described, and if at least one of the elements occupying a cardinal position from among North, East, West and South carries the value "0".

If these conditions are not met, the central element is not a simple point (FIGS. 9d, 9e and 9f).

Figure 10:
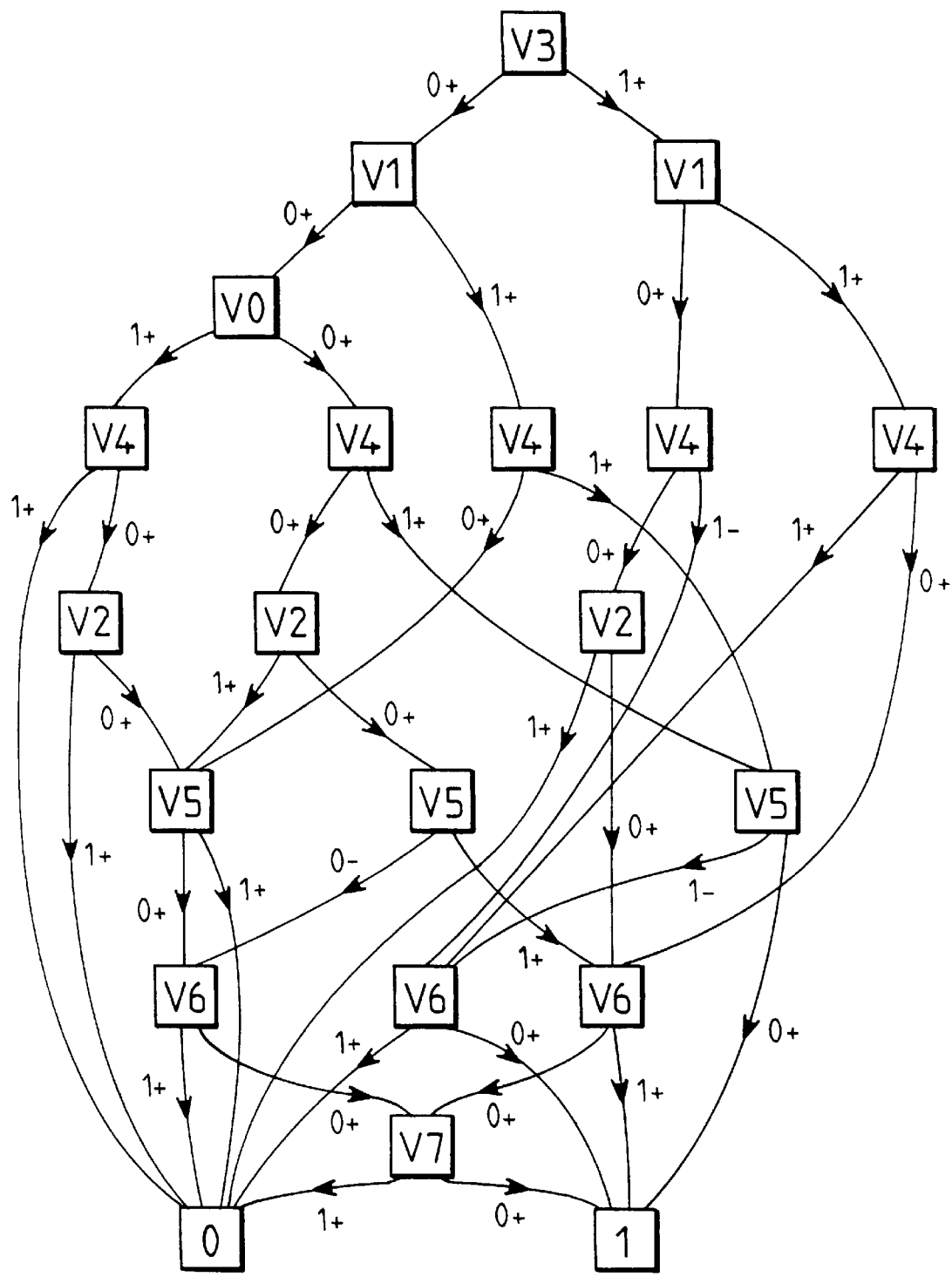
FIG. 10 represents the reduced and ordered binary decision diagram, with inverting branch instructions, which is associated with the detection of simple points in a two-dimensional image, and FIGS. 11a and 11b respectively represent the views from above and below of the neighbourhoods chosen in the example described, for the processing of a three-dimensional image by thinning lines and/or surfaces.

FIG. 10 represents the BDD equivalent to the tree structure which provides the processing operation for detecting simple points of a 2D image, according to the invention. A check is firstly made that, if a path is being followed through the tree structure between the first test of the element V3 up to one of the terminal nodes "0" or "1", each pixel of the neighbourhood is examined only once. A check is furthermore made that only one path examines all of the eight pixels of the neighbourhood (V0, . . . , V7=0): if the first seven elements have the value "0" V0, . . . , V6=0), then the eighth V7 is examined.

The binary decision diagram starts with a first test on the value of V3 (West). In view of the connectivity criterion chosen, the binary decision diagram could start with another pixel from among V1, V4 or V6 (North, South, East). Pixel V1 (North) is then tested. It may then be noted that:

the tests deal with the bits of at least three pixels occupying three respective cardinal positions from among North, East, West and South, and do so independently of the bit values of the elements of the neighbourhood, the elements V0, V2, V7 and V5 are tested only if a 4-connected element from among V1, V4, V6 and V3, with which it has one side in common, is at the bit value "0".

This processing thus analyses:

one of the two elements at North-East and North-West only if the element at North has a bit value equal to "0", one of the two elements at North-East and South-East only if the element at East has a bit value equal to "0", one of the two elements at North-West and South-West only if the element at West has a bit value equal to "0", and one of the two elements at South-East and South-West only if the element at South has a bit value equal to "0".

Each branch from a test is associated with a "1" or "0" bit value of the element tested. Furthermore, the binary values indicated are followed by a + or − sign depending on whether or not the branches are from a complementary edge. The set of conditional branch instructions thus has a subset of inverting branch instructions marked by a − sign.

A transcription of the processing obtained, corresponding to the binary decision diagram represented in FIG. 10, is given in Annex I in the form of a program compiled in the C language. It has nineteen test lines of the "if" type, corresponding to the nineteen test nodes of the diagram. The terminal nodes of the diagram are represented by the final instructions "return" which appear in lines L080 and L081. Furthermore, the inverting branch instructions appear in lines L896, L864 and L560, which then carry the instruction "R=!R".

The processing then uses one of lines L080 and L081 to define whether or not the central element is simple, depending on the analysed value of R.

Some of the "goto" instructions can further be removed by using the network structure of the binary decision diagram represented in FIG. 10. Annex II then gives a transcription of the equivalent processing programmed in the C language. The two programs are equivalent. It can in particular be noted, in both cases, that the bit value of the simple point is not assigned definitively in the two stop points, for example in the case of Annex I at lines L080 and L081.

The comparison between the pixels of the neighbourhood is thus completed at one of these two stop points, the logic states R and !R being conjugate. In particular, taking account of the inverting branch instructions, the value R (or of !R) is kept at R (at !R) if the inverting branch instructions taken when running through the tree structure add up to an even number, and the value of R (or of !R) is inverted to !R (to R) if the inverting branch instructions taken when running through the tree structure add up to an odd number.

In the example, if the path through the BDD is completed at the terminal node "0" ("1") and the number of inverting branch instructions taken is even, the current pixel is not a simple point (is a simple point). Conversely, if the path through the BDD is completed at the terminal node "0" ("1"), and the number of inverting branch instructions taken is odd, the current pixel is a simple point (is not a simple point).

In the case of processing by thinning or by thickening with a prior search for simple points, the value of a current pixel depends:

on the terminal node at the end of a path through the BDD, on the value R or !R of this terminal node (simple point or not), and on the initial value of this current pixel (a "1" simple point is converted to "0" by thinning; a "0" simple point is converted to "1" by thickening).

In the transcriptions of examples of processing to search for simple points in Annexes I and II, the predetermined value of R is equal to "0".

The number of tests is advantageously reduced by using the processing operation relying on a binary decision diagram with an expression thus reduced. More specifically, the processing operation according to the invention provides on average 4.72 tests for a pixel of a 2D image, while a conventional processing operation, which does not take all the symmetries of the problem into account, may provide 7 tests on average.

Thus, in the sense of the present invention, a reduced expression of the binary decision diagram meets all or some of the following conditions:

there are pixels which are not systematically analysed: V0, V2, V5, V6 and V7, the processing provides $2^N$ terminal nodes if the result is coded on N bits, there are nodes of the diagram to which a plurality of entries are provided: two entries to V7, two or three entries to V6 or to V5, the processing operation has inverting branch instructions, and the nodes relating to pixels such as V0 and V7 appear once only.

FIGS. 11a and 11b represent a view from above and a view from below of a neighbourhood associated with a current element in a 3D image. The current element lies at the centre of a parallelepiped, cubic in the example, which all the elements of the neighbourhood constitute. The neighbourhood then has twenty-six scaling cubic elements.

For a three-dimensional image sampled as a multiplicity of voxels (or blocks), the processing compares the bits of the twenty-six voxels which are nearest-neighbours of the current central voxel. Six voxels occupy the centre of the faces of the cube of which the current voxel is the centre. Eight elements occupy the vertices and twelve occupy the centres of the edges.

The neighbourhood is indexed in the following way:

on a first face of the block, the elements are indexed from V0 to V8, on the opposite face, the elements are indexed from V18 to V25, and on the central spice, the elements are indexed from V9 to V16, the current central element not being indexed.

Here, the connectivity criterion for the detection of simple points involves the choice of six 6-connected components, relying on the formulism described in particular by:

[5]—"A new characterization of three-dimensional simple points" (G. Bertrand and G. Malandain, *Pattern recognition letters*, 15-2, 169–175, 1994).

The binary decision diagram of reduced order and compact shape with inverting branch instructions has 503 nodes. A transcription of the C language program obtained, corresponding to this ROBDD, is given in Annex III. Whereas a conventional processing operation disclosed for example by the reference:

[6]—"Boolean characterization of 3D simple points" (G. BERTRAND, *Pattern Recognition Letters*, 17, 115–124, 1996)

has on average 111 tests, the processing operation using a BDD according to the invention has on average 8.71 tests per element selected.

The processing operation here analyses the bit values of at least five voxels occupying five positions from among the six centres of the faces, independently of the bit values of the other voxels of the neighbourhood; and analyses one of the voxels of a face only if the voxel occupying the centre has a bit value equal to "0".

The equivalent binary decision diagram again has two terminal nodes on the basis of which the central element can be defined as being a simple point or not. In the example, the current block is a simple point if the blocks having the bit values "1" are pairwise neighbours by a face, by a side or by a vertex and if there is at least one of them, and if the blocks having a bit value "0" and neighbouring the central block by a face are connected together by means of elements having a bit value "0" and neighbouring the central block by an edge and if there is at least one of them.

Conversely, the central element is not defined as being a simple point if the elements of the neighbourhood do not meet these conditions. The simple points of a 3D image are thus detected.

For example, the thinning of the binary images consists in erasing "1" points which are simple and which are not end points. Customarily, processing devices are designed in such a way that the two tests (simple points and end points) are carried out one after the other. For example, an erasure condition is described by the reference:

[7]—"A parallel thinning algorithm for medial surfaces" (G. BERTRAND, *Pattern Recognition Letters*, 16, 979–986, 1995)

This condition relies on a Boolean characterization described by the reference [6], to which the following condition is added: "Is the simple point an end point?"

This new constraint generally increases the number of tests. However, a binary decision diagram which meets these two conditions at the same time provides only 272 nodes, that is to say the number of tests carried out is even smaller than before. A transcription of the processing operation according to the invention, programmed in the C language, is given in Annex IV. The number of tests carried out on average by using a BDD according to the invention and satisfying the aforementioned two conditions is thus 5.16. However, this number is 114.1 if the formalism described in reference [7] is applied.

Mention may furthermore be made, by way of example, of another method which consists in running through the 3D image in the six directions North, South, East, West, up and down passing through the six centres of the faces of the block, by performing successive iterations in these directions. This method is disclosed by the reference:

[8]—"A simple parallel 3-D thinning algorithm" (W. X. GONG and G. BERTRAND, 10th *International Conference on Pattern Recognition*, Atlantic City, Jun. 17–21, 1990)

It is therefore equivalent to meeting five conditions which can easily be transcribed in terms of Boolean expressions. The simplified binary decision diagram in this case carries out 3.27 tests on average per element examined, whereas the formalism used in reference [8] provides on average 4.83 tests.

The C language programs which appear in Annexes I, II, III and IV below are compiled in a UNIX environment. The time for processing a 3D image by thinning is typically close to 0.25 µs per voxel, on central processing units provided with 167 MHz processors (SUN Ultral Sparc or DEC Alpha 3000) (registered trademarks).

The computer language used for programming the processing operations may of course be other than the C language.

Advantageously, the device described above has, in the memory area, the respective instruction sets of a plurality of calculation modules, each designed for one type of processing from among erosion, dilation and thinning of lines and/or surfaces of 2D and/or 3D images, the image management system making it possible for a user to choose one of these processing operations. Each calculation module is then provided with an instruction set optimized by a technique of reducing the binary decision tree associated with the chosen processing function. This reduction may be carried out by means of a computer processing operation, in particular disclosed by:

[9]—"Symbolic boolean manipulation with ordered binary decision diagrams" (R. E. Bryant, *Technical Report* CMU-CS-92-160, School of Computer Science, Carnagie Mellon University, June 1992)

The invention is not limited to the embodiment described above by way of example, and covers other variants.

It will thus be understood that the sequence to be processed is not necessarily a digital image. The test method according to the invention can also be applied to the processing of a sound sequence represented using a frequency and intensity topology.

Furthermore, the processing operation described above can also be applied to a one-dimensional image. In this case, the neighbourhood chosen for each current element may extend over one or two curve segments.

The operations of processing by thinning, detection of simple points, erosion and dilation are described by way of example. The invention may be applied in general to an arbitrary processing function, broken down into simple Boolean operations, in particular by the brute force method.

Furthermore, the connectivity criteria chosen for the detection of simple points are described above by way of example. In a variant, the criteria chosen may be different.

The simplification of the binary decision diagram according to the method of the invention may be only partial. For certain applications, it may thus not contain any inverting branch instruction (ROBDD), or may alternatively comprise more than two terminal nodes.

Furthermore, the definitions of the erosion and dilation functions may be generalized in the following way: a result bit of predetermined value is assigned to a current element if all the elements of the neighbourhood have respective bit values equal to this predetermined value, and a result bit of conjugate value is assigned otherwise.

Lastly, the erosion and/or dilation processing of three current elements at a time, of a 2D image, is described above by way of example. More generally, the processing operation according to the invention may be applied to one or more current elements at a time, of a 2D or 3D image.

We claim:

1. In a device for processing acquisition data, in particular image data, comprising:
    a) a first memory area adapted for storing a sequence of acquisition data, in the form of sequence elements, each having at least one bit,
    b) a second memory area comprising a calculation module for access to the first memory area, which can be addressed in order to access the neighbourhood of a designated current element,
    c) a third memory area adapted for storing a calculation module, capable of receiving as input a designation of at least one current element, in order to deliver as output to the said neighbourhood of this current element a result word representative of the application of a chosen processing function having a binary decision tree associated therewith, said calculation module comprising a set of instructions, with test instructions, each relating to one bit, and forming, from an input instruction, paths where the test instructions are relayed to reach final instructions defining the result word, bit by bit;
    d) control means for repetitively implementing said module in cooperation with a working memory, on the basis of successive current elements, in order to obtain a multiplicity of result words, representing an at least partial transform of the sequence by the said processing function;

the improvement wherein said calculation module is provided with an instruction set optimized by a technique of reducing said binary decision tree associated with said function, in order jointly to minimize the total number of test instructions accumulated over all the paths defined by the test instruction set and the total number of instructions in this set, which makes it possible to increase the processing speed by a better compromise between the total memory occupancy of the instruction set and its execution speed.

2. Device according to claim 1, wherein each test instruction has a conditional branch instruction to another test instruction or a final instruction, as a function of the bit which is tested, while the test instruction set accesses a bit of an element in the neighbourhood at most only once during execution.

3. Device according to claim 2, wherein said calculation module has, in said second memory area, at most two final instructions, while the test instructions are relayed, during execution, to one of the two final instructions, designed to designate a result variable representative of one bit of the result word.

4. Device according to claim 3, wherein the test instruction set has test instructions with inverting branch instructions, while each bit of the result word is defined in correspondence with the associated result variable and a parity of the number of inverting branch instructions taken during execution.

5. Device according to claim 3, wherein said first memory area is designed to store a sequence of two-dimensional image data in the form of a multiplicity of bits, comprising at least one bit per pixel of this image, while the access module is designed to designate a neighbourhood associated with a current pixel, containing eight nearest-neighbour pixels of the current pixel by a side or a vertex of said current pixel; wherein said calculation module is designed to deliver as output a result word which is a function of the pixels of the neighbourhood and varies depending on whether or not the current pixel is a simple point, a current pixel being defined as a simple point of a two-dimensional image if one or more of the pixels of the neighbourhood associated with this current pixel, necessarily pairwise neighbouring by a side or a vertex, have bit values equal to a predetermined value, while at least one of the pixels neighbouring the current pixel by a side has a bit value conjugate to the said predetermined value; and wherein the input instruction is designed to test one bit of one of the four pixels neighbouring the current pixel by one side thereof, while the test instruction set is designed on the one hand to compare the bits of three pixels neighbouring the current pixel by one side thereof, and to do so independently of the values of the bits of the other pixels of the neighbourhood, and on the other hand to analyse a pixel neighbouring by a vertex only if two pixels of the neighbourhood which each neighbour this pixel and the current pixel by a side, have bit values equal to the said conjugate value.

6. Device according to claim 3, wherein said first memory area is capable of storing a sequence of three-dimensional image data in the form of a multiplicity of bits comprising at least one bit per block of this image, while the access module is designed to designate a neighbourhood associated with a current block, containing twenty-six nearest-neighbour blocks of the current block, six of said first blocks occupying the centre of the faces of a parallelepiped of which the current block is the centre, eight of said first blocks occupying the vertices and twelve of said first blocks occupying the centres of the edges; wherein said calculation module is designed to deliver as output a result word which is a function of the blocks of the neighbourhood of a current block and varies depending on whether or not this current block is a simple point, a current block being defined as a simple point of a three-dimensional image if the blocks of the neighbourhood associated with this current block, with respective bit values equal to a predetermined value, are pairwise neighbours by a face, a side or a vertex and if there is at least one of them, while blocks of the neighbourhood with respective bit values conjugate to the said predetermined value are neighbours of the current block by a face and are connected together by a block, with bit value equal to the said conjugate value, neighbouring the current block by an edge, and if there is at least one; and wherein the input instruction is designed to test one bit of one of the six blocks neighbouring the current block by a face, while the test instruction set is designed on the one hand to compare the bits of five blocks of the neighbourhood each occupying one of the six centres of the faces and to do so independently of the bits of the other blocks of the neighbourhood, and on the other hand to analyse the bit of one of the blocks of a face only if the block occupying the centre of this face has a bit value equal to the said conjugate value.

7. Device according to claim 3 wherein said calculation module is designed to evaluate a result word on the basis of a plurality of nearest-neighbour current elements in the sequence; and wherein the access module is designed to designate a neighbourhood containing these current elements, as well as elements of the nearest-neighbour sequence of the current elements, while the result variable is representative of the truth of a hypothesis ("false", "true") formulated on each bit of the result word associated with a current element.

8. Device according to claim 7, wherein said calculation module is designed to evaluate a result word of an image erosion and/or dilation function, by assigning to each current element a result bit of predetermined value if all the elements of the neighbourhood have respective bit values equal to the said predetermined value, and a result bit of conjugate value otherwise.

9. Device according to claim 1, wherein said first memory area is designed to store a sequence of two-dimensional image data in the form of a multiplicity of bits, comprising at least one bit per pixel of this image, while the access module is designed to designate a neighbourhood associated with a current pixel, containing eight nearest-neighbour pixels of the current pixel by a side or a vertex of said current pixel.

10. Device according to claim 9, wherein said calculation module is designed to deliver as output a result word which is a function of the pixels of the neighbourhood and varies depending on whether or not the current pixel is a simple point, a current pixel being defined as a simple point of a two-dimensional image if one or more of the pixels of the neighbourhood associated with this current pixel, necessarily pairwise neighbouring by a side or a vertex, have bit values equal to a predetermined value, while at least one of the pixels neighbouring the current pixel by a side has a bit value conjugate to the said predetermined value.

11. Device according to claim 10, characterized in that it furthermore has a means for detecting end points of lines and/or surfaces of the image, while said calculation module has at least one result instruction designed to cooperate jointly with the final instructions and the detection means in order to designate a result word of a current element, which varies depending on whether or not this current element is, on the one hand, a simple point and, on the other hand, an end point which makes it possible to perform thinning of lines and/or surfaces of the image.

12. Device according to claim 11, wherein said calculation module is designed to evaluate a result word of an image erosion and/or dilation function, by assigning to each current element a result bit of predetermined value if all the elements of the neighbourhood have respective bit values equal to the said predetermined value, and a result bit of conjugate value otherwise; and wherein it has a system for managing the image, which can cooperate with the control means in order to allow a user to choose a processing function from among image erosion, image dilation and thinning of lines and/or surfaces, while said calculation module is provided with an instruction set optimized by a technique of reducing said binary decision tree associated with the chosen processing function.

13. Device according to claim 1, wherein said first memory area is capable of storing a sequence of three-dimensional image data in the form of a multiplicity of bits comprising at least one bit per block of this image, while the access module is designed to designate a neighbourhood associated with a current block, containing twenty-six nearest-neighbour blocks of the current block, six of said first blocks occupying the centre of the faces of a parallelepiped of which the current block is the centre, eight of said first blocks occupying the vertices and twelve of said first blocks occupying the centres of the edges.

14. Device according to claim 13, wherein said calculation module is designed to deliver as output a result word which is a function of the blocks of the neighbourhood of a current block and varies depending on whether or not this current block is a simple point, a current block being defined as a simple point of a three-dimensional image if the blocks of the neighbourhood associated with this current block, with respective bit values equal to a predetermined value, are pairwise neighbours by a face, a side or a vertex and if there is at least one of them, while blocks of the neighbourhood with respective bit values conjugate to the said predetermined value are neighbours of the current block by a face and are connected together by a block, with bit value equal to the said conjugate value, neighbouring the current block by an edge, and if there is at least one.

15. Device according to claim 1, wherein said acquisition data relate to a medical image of biological, in particular human tissue.

* * * * *